US008553813B2

United States Patent
Chen

(10) Patent No.: US 8,553,813 B2
(45) Date of Patent: Oct. 8, 2013

(54) METHOD FOR COMPUTING CORRELATION OF PN SEQUENCE AND CIRCUIT THEREOF

(75) Inventor: Chin-Tai Chen, Pingzhen (TW)

(73) Assignee: Realtek Semiconductor Corp., Hsinchu (TW)

(*) Notice: Subject to any disclaimer, the term of this patent is extended or adjusted under 35 U.S.C. 154(b) by 736 days.

(21) Appl. No.: 12/720,988

(22) Filed: Mar. 10, 2010

(65) Prior Publication Data

US 2010/0310021 A1    Dec. 9, 2010

(30) Foreign Application Priority Data

Jun. 5, 2009 (CN) .......................... 2009 1 0146008

(51) Int. Cl.
*H03D 1/00* (2006.01)
(52) U.S. Cl.
USPC .......................................... 375/343; 375/316
(58) Field of Classification Search
USPC ................ 375/142, 143, 147–150, 152, 343, 375/316, 365–367; 704/216, 218, 237, 263; 708/5, 422, 813; 342/108, 145, 189, 378
See application file for complete search history.

(56) References Cited

U.S. PATENT DOCUMENTS 6,459,723 B1 * 10/2002 Kim et al. ..................... 375/146
6,603,735 B1 * 8/2003 Park et al. ..................... 370/208

FOREIGN PATENT DOCUMENTS

TW 200733588 A 12/1995

OTHER PUBLICATIONS

TW Office Action dated Dec. 22, 2012.
English Abstract translation of TW200733588 (Published Dec. 13, 1995).

* cited by examiner

*Primary Examiner* — Sam K Ahn
*Assistant Examiner* — Janice Tieu
(74) *Attorney, Agent, or Firm* — McClure, Qualey & Rodack, LLP

(57) ABSTRACT

The present invention relates to a method for computing correlation of a PN sequence and a circuit thereof. A plurality of input values of an input sequence is summed up to give a first sum. A PN sequence comprising a plurality of first values and a plurality of second values, which correspond to the plurality of input values, are received. Summing up the plurality of input values corresponding to the plurality of first input values in the PN sequence gives a second sum. According to the first sum and the second sum, a correlation value is given. The present invention uses a simple method for computing correlation of a PN sequence. Hence, the operation efficiency is enhanced and the time to give the correlation of the PN sequence is shortened.

20 Claims, 6 Drawing Sheets y(n)    a b c d e f g h I j k l m n o p q r p(n)    1(-1-1) 1(-1-1) 1(-1-1) 1 1 1(-1-1) 1 1
         ↳30    ↳32    ↳34        ↳36 p(n)    1(-1-1) 1(-1-1) 1(-1-1) 1 1 1(-1-1) 1 1
         ↳30    ↳32    ↳34        ↳36

METHOD FOR COMPUTING CORRELATION OF PN SEQUENCE AND CIRCUIT THEREOF

FIELD OF THE INVENTION

The present invention relates to a communication system, and particularly to a method for computing correlation of a PN sequence and a circuit thereof in a communication system.

BACKGROUND OF THE INVENTION

In a communication system, a PN sequence with known characteristics can be transmitted to the receiver for performing synchronization or channel estimation using the PN sequence. The general methods include calculating the linear correlation or circular correlation between the received signal and the PN sequence for performing synchronization or channel estimation. FIG. 1A shows a schematic diagram of performing linear correlation according to the prior art. FIG. 1B shows a schematic diagram of performing circular correlation according to the prior art. The linear or circular correlation multiplies and accumulates the corresponding bits of the received signal y(n) and the PN sequence p(n). Thereby, if the length of the input sequence y(n) is long, the adder and the amount of the adding operations in the receiver are increased, complicating and increasing the cost of the receiver. In addition, when the receiver computes correlation between the input sequence y(n) and the PN sequence p(n), the input sequence stored in the memory has to be accessed continuously. As a result, the operational speed is lowered, and hence the operational efficiency is reduced.

Accordingly, the present invention provides a method for computing correlation of a PN sequence and a circuit thereof, which can reduce the amount of operations and the number of times by which the memory is accessed.

SUMMARY

An objective of the present invention is to provide a method for computing correlation of a PN sequence and a circuit thereof, which can reduce the amount of operations for correlation between an input sequence and a PN sequence. Thereby, the area of the computational circuit is reduced, and hence the cost is reduced.

Another objective of the present invention is to provide a method for computing correlation of a PN sequence and a circuit thereof, which can reduce the number of times by which the memory is accessed. Thereby, the operational speed is increased, and the operational efficiency is enhanced.

The circuit for computing correlation of a PN sequence comprises a control unit, a storage unit, and an operational unit. The method for computing correlation of a PN sequence comprises the following steps. The control unit receives an input sequence and a PN sequence. The input sequence includes a plurality of input values; the PN sequence includes a plurality of first values and a plurality of second values. The pluralities of first values and second values correspond to the plurality of input values. The control unit produces a control signal according to the plurality of first values. The storage unit stores the plurality of input values received by the control unit, and outputs the plurality of input values corresponding to the plurality of first values according to the control signal. The operational unit sums up the plurality of input values and gives a first sum, and sums up the plurality of input values output by the storage unit and gives a second sum. Furthermore, the operational unit gives a correlation value according to the first sum and the second sum. Thereby, the amount of operations for correlation between the input values and the PN sequence can be reduced, which, in turn, reduces the area of the operational circuit and the cost. In addition, the number of times by which the memory is accessed is reduced. Thereby, the operational speed is increased, and the operational efficiency is enhanced.

After having read the contents or/and figures of the present patent specification, a person having ordinary skill in the art can easily understand other objectives, characteristics, or effects of the present invention.

BRIEF DESCRIPTION OF THE DRAWINGS

FIG. 4 shows a schematic diagram of performing linear correlation according to a preferred embodiment of the present invention;

FIG. 5 shows a schematic diagram of performing circular correlation according to a preferred embodiment of the present invention; and FIG. 6 shows a schematic diagram of performing linear correlation according to another preferred embodiment of the present invention.

DETAILED DESCRIPTION

In order to make the structure and characteristics as well as the effectiveness of the present invention to be further understood and recognized, the detailed description of the present invention is provided as follows along with preferred embodiments and accompanying figures.

Figure 1A:
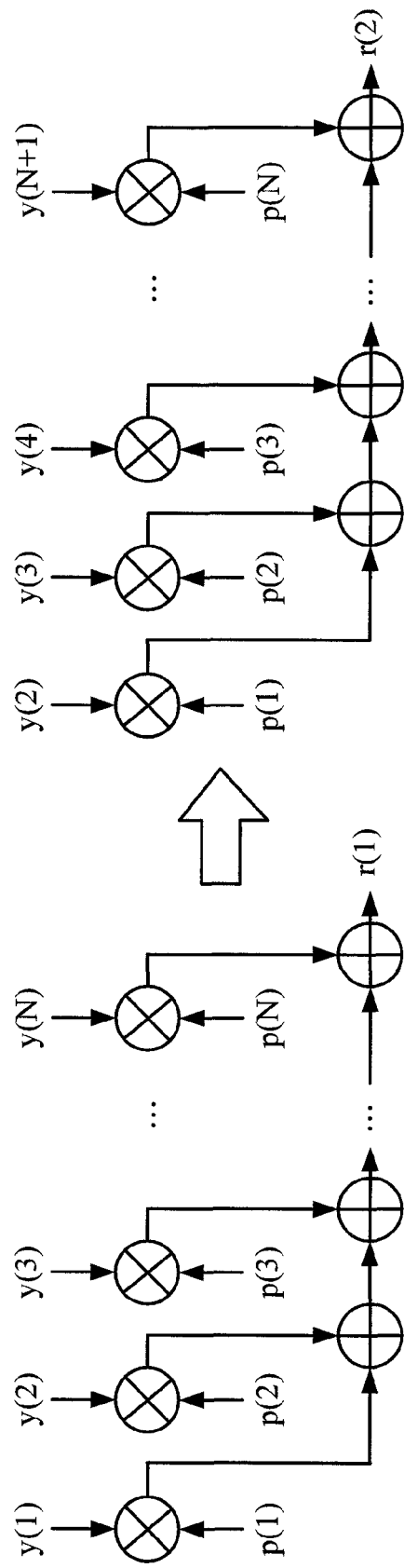
FIG. 1A shows a schematic diagram of performing linear correlation according to the prior art.
Figure 1B:
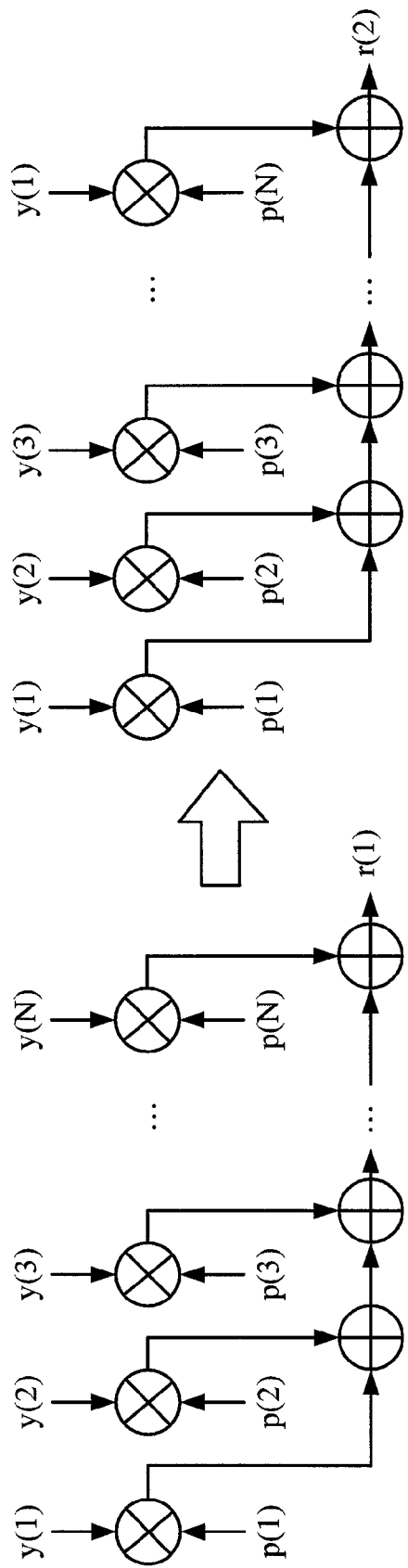
FIG. 1B shows a schematic diagram of performing circular correlation according to the prior art.
Figure 2:
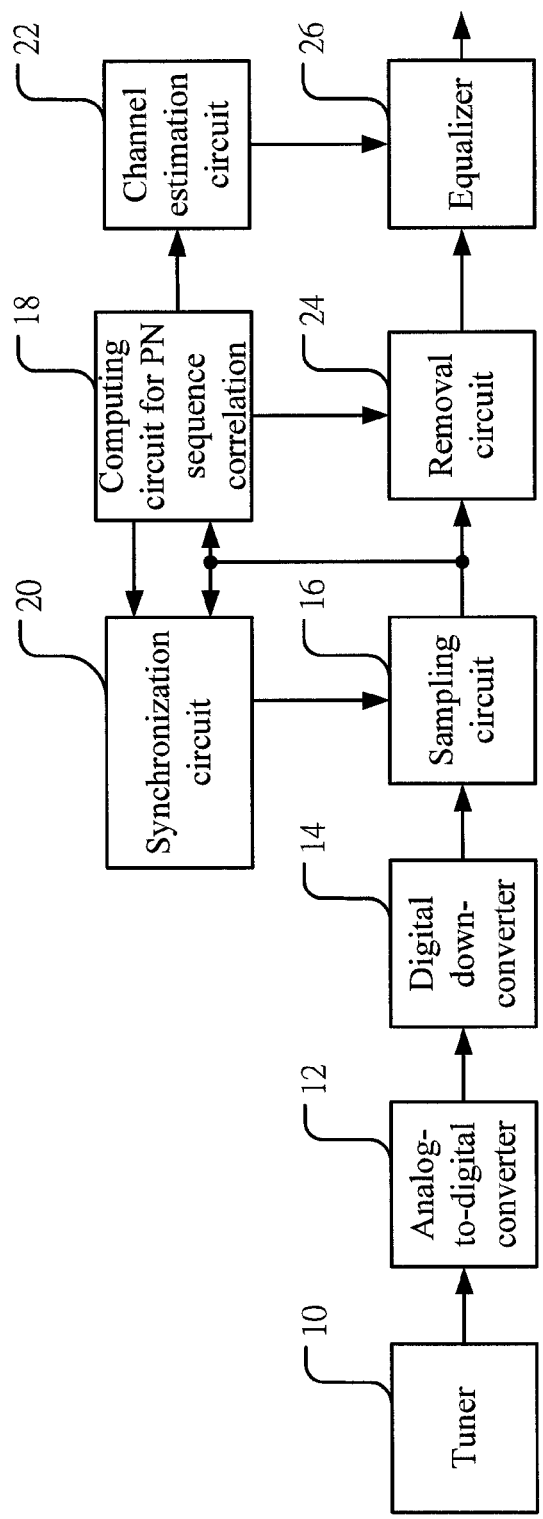
FIG. 2 shows a block diagram of a receiver according to a preferred embodiment of the present invention.

FIG. 2 shows a block diagram of a receiver applying a circuit for computing PN sequence correlation 18 according to a preferred embodiment of the present invention, used for describing the circuit for computing PN sequence correlation 18 according to the present invention. However, FIG. 2 is only a preferred embodiment of the present invention. The circuit for computing PN sequence correlation 18 according to the present invention can be applied to other applications needing computational circuits for correlation. As shown in the figure, the receiver 1 comprises a tuner 10, an analog-to-digital converter 12, a digital down-converter 14, a sampling circuit 16, a circuit for computing PN sequence correlation 18, a synchronization circuit 20, a channel estimation circuit 22, a removal circuit 24, and an equalizer 26. The circuit for computing PN sequence correlation 18 produces a correlation value according to a baseband signal processed by the sampling circuit 16 and a PN sequence. The correlation value represents correlation, and is transmitted to the synchronization circuit 20, the removal circuit 24, and the channel estimation circuit 22. The synchronization circuit 20 produces a synchronization signal according to the correlation value, and transmits the synchronization signal to the sampling circuit 16, which can process according to the synchronization signal. The removal circuit 24 removes the PN sequence in the baseb and signal according to the correlation value of the circuit for computing PN sequence correlation 18, and transmits the baseband signal with the PN sequence removed to the equalizer 26. The channel estimation circuit 22 receives the correlation value of the circuit for computing PN sequence correlation 18, performs channel estimation according to the correlation value, produces an estimation signal, and transmits the estimation signal to the equalizer 26. The equalizer 26 equalizes the received baseband signal according to the estimation signal, and produces an output signal for subsequent circuits.

Figure 3:
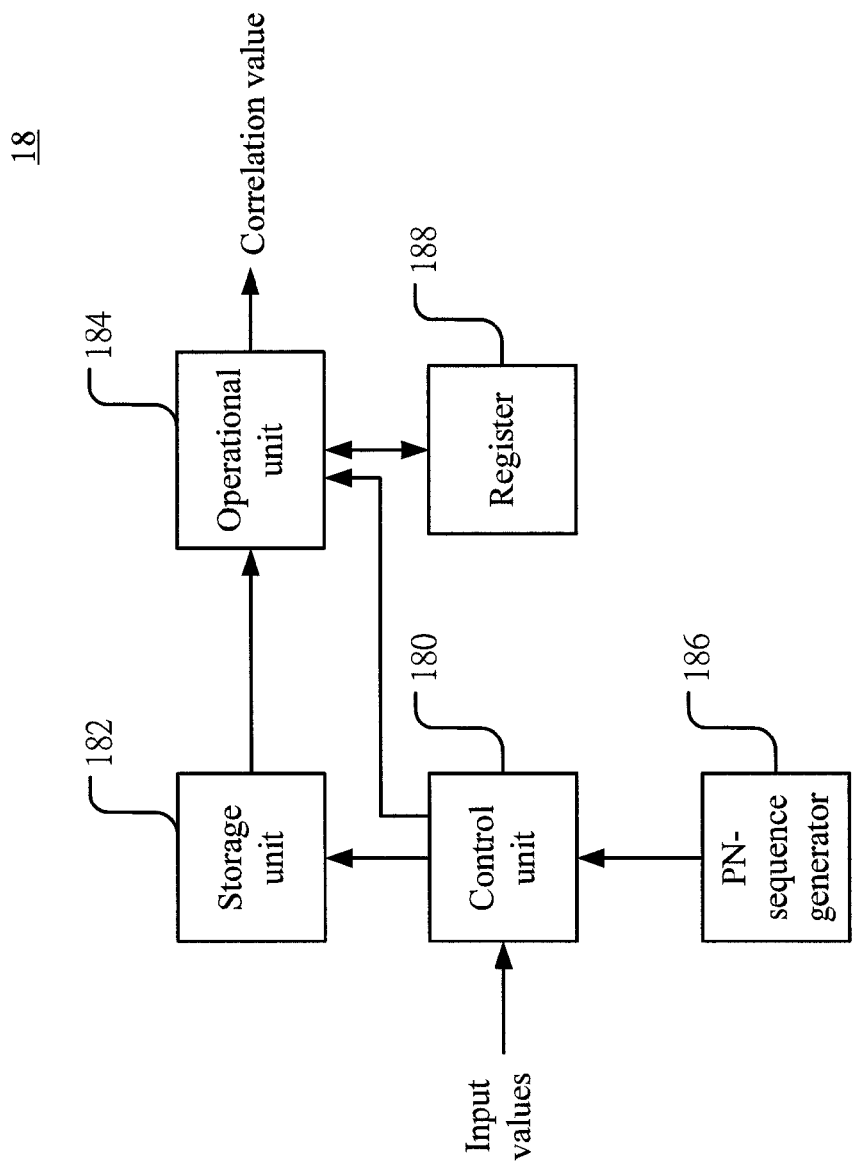
FIG. 3 shows a block diagram of a circuit for computing according to a preferred embodiment of the present invention.

FIG. 3 shows a block diagram of a circuit for computing PN sequence correlation according to a preferred embodiment of the present invention. The circuit for computing PN sequence correlation 18 comprises a control unit 180, a storage unit 182, and an operational unit 184. A preferred embodiment of said storage unit 182 is a memory. The control unit 180 of the circuit for computing PN sequence correlation 18 receives the output signal output by the sampling circuit 16 as an input sequence y(n), which comprises a plurality of input values. The storage unit 182 registers the plurality of input values and transmits the plurality of input values to the operational unit 184. The control unit 180 receives a PN sequence p(n), and produces a control signal according to the PN sequence p(n). The operational unit 184 gives a correlation value representing correlation of the PN sequence according to the control signal and the plurality of input values. The circuit for computing PN sequence correlation 18 further comprises a PN-sequence generator 186 used for generating the PN sequence. In the following embodiments, the methods for computing the correlation values by the operational unit 184 are described.

FIG. 4 shows a schematic diagram of performing related operations according to a preferred embodiment of the present invention. According to the present preferred embodiment, linear correlation is used for description. However, the present invention is not limited to linear correlation operations only. As shown in the figure, the control unit 180 according to the present invention receives the input sequence y(n) and the PN sequence p(n). The input sequence y(n) includes a plurality of input values a, b, c, d, e, f, g, h, i, j, k, l, m, n, o, p, q; the PN sequence p(n) includes a plurality of first values and a plurality of second values. The pluralities of first and second values are a plurality of negative PN values and a plurality of positive PN values, respectively, and are 1, −1, −1, 1, −1, −1, −1, 1, −1, −1, 1, 1, −1, −1, −1, 1, 1. The correlation value between the input sequence y(n) and the PN sequence p(n) is (a−b−c+d−e−f−g+h−i−j+k+l−m−n−o+p+q).

The method for computing according to the present invention comprises the following steps. First, the control unit 180 stores the plurality of input values (a~q) to the storage unit 182, and transmits the plurality of input values (a~q) to the operational unit 184. The operational unit 184 sums the plurality of input values (a~q) of the input sequence y(n) and gives a first sum, namely, (a+b+c+d+e+f+g+h+i+j+k+l+m+n+o+p+q). The control unit 180 produces the control signal according to the plurality of first values of the PN sequence p(n). The storage unit 182 reads the input values corresponding to the plurality of first values according to the control signal, and transmits the input values to the operational unit 184 for summing and giving a second sum. That is, the operational unit 184 sums the plurality of input values b, c, e, f, g, i, j, m, n, o corresponding to the plurality of first values and gives the second sum (b+c+e+f+g+i+j+m+n+o). The operational unit 184 gives the correlation value according to the first and second sums. Namely, the correlation value is given by subtracting twice the second sum from the first sum:

$$(a+b+c+d+e+f+g+h+i+j+k+l+m+n+o+p+q)-2*(b+c+e+f+g+i+j+m+n+o)=(a-b-c+d-e-f-g+h-i-j+k+l-m-n-o+p+q)$$

It is proven that the correlation value given according to the method for computing of the present invention is the correct correlation value. According to the present invention, it is not necessary to multiply and accumulate the input values of the input sequence y(n) and the corresponding PN values of the PN sequence p(n) to give the correlation value as the way according the prior art. Thereby, the amount of operations for correlation according to the present invention can be reduced, reducing the circuit area of the circuit for computing PN sequence correlation 18 in the receiver and thus reducing costs.

Besides, according to the method for computing of the present invention, it is only necessary to read the plurality of input values stored in the storage unit 182 corresponding to the plurality of first values of the PN sequence p(n) but not all of the input values. The pluralities of first and second values of the PN sequence p(n) are generated by random numbers, and thus the probabilities of occurrence of first and second values are approximately 50%, respectively. Thereby, each time when the correlation value is calculated, the number of times the storage unit 182 is read is half the number of times according to the prior art. Accordingly, the method for computing according to the present invention can increase the operational speed and hence enhance operational efficiency.

Each time when the correlation between the input sequence y(n) and the PN sequence p(n) is computed, it is necessary to shift the input sequence y(n) or the PN sequence p(n) for changing the PN sequence p(n) to correspond the input sequence y(n) and then computing a new correlation value. That is to say, when computing the correlation values sequentially, it is necessary to shift the input sequence y(n) or the PN sequence p(n) sequentially for performing computations sequentially and giving correlation values sequentially. The plurality of first values in the PN sequence p(n) is divided into a plurality of negative groups (referring to FIG. 4). When the operational unit 184 computes a new correlation value, the input sequence y(n) or the PN sequence p(n) shift one bit only. Thereby, when computing adjacent different correlation values, the plurality of input values corresponding to the plurality of first values in each of the negative groups overlaps. Hence, the present takes advantage of this characteristic and further provides another method for computing, which can further reduce the number of times the storage unit 182 is accessed, and thus increasing the operational speed and efficiency. In the following embodiments, how the operational unit 184 performs computations by applying the plurality of negative groups and gives correlation values will be described.

In FIG. 4, the PN sequence p(n) has a plurality of negative groups, namely, a first negative group 30, a second negative group 32, a third negative group 34, and a fourth negative group 36. While computing the first correlation value, the input values corresponding to the first negative group 30 are (b, c); the input values corresponding to the second negative group 32 are (e, f, g); the input values corresponding to the third negative group 34 are (i, j); the input values corresponding to the fourth negative group 30 are (m, n, o). The operational unit 184 will sum up the plurality of input values corresponding to the plurality of first values in each of the negative groups with the same length, and give group sums, respectively. That is, the plurality of input values corresponding to the plurality of negative values in each of the negative groups with the same length is summed up, and group sums are thereby given, respectively. According to the present embodiment, there are negative groups with two lengths, including the first negative group 30 and the third negative group 34 with two first values, and the second negative group 32 and the fourth negative group 36 with three first values, respectively. According to the description above, the operational unit 184 sums up the plurality of input values corresponding to the first negative group 30 and the plurality of input values corresponding to the third negative group 34 and gives a first group sum (b+c)+(i+j), and sums up the plurality of input values corresponding to the second negative group 32 and the plurality of input values corresponding to the fourth negative group 36 and gives a second group sum (e+f+g)+(m+n+o). The operational unit 184 then sums the first and second group sums, and gives the second sum (b+c)+(e+f+g)+(i+j)+(m+n+o). Besides, the operational unit 184 subtracts twice the second sum from the first sum, and gives the first correlation value.

If linear correlation is used for continuing computing the second correlation value, after the operational unit 184 completes computing the first correlation value, the control unit 180 will receive a new input value and store in the storage unit 182 to replace an input value of the plurality of input values. As shown in FIG. 4, the control unit 180 receives the new input value r to replace the first input value a. According to the method for computing correlation value described above, the first sum is required. Because one of the original input values has been replaced, the original first sum will change accordingly. According to the present embodiment, the new first sum is (b+c+d+e+f+g+h+i+j+k+l+m+n+o+p+q+r), which is equal to adding the new input value r to the original first sum and subtracting the first input value a. It is known from above that according to the method for computing, only the original first sum, the new input value, and the replaced input value are needed to give the new first sum. It is not necessary to re-sum up all of the input values, and thus reducing the amount of operations.

While computing the second correlation value, the correspondence of the plurality of first values of the plurality of negative groups to the plurality of input values will be changed. According to the present embodiment, the PN sequence p(n) will right shift a position for changing the correspondence of the input values to the plurality of first values of the negative groups. As shown in FIG. 4, the input values corresponding to the first negative group 30 are changed to (c,d); the input values corresponding to the second negative group 32 are changed to (f,g,h); the input values corresponding to the third negative group 34 are changed to (j,k); the input values corresponding to the fourth negative group 36 are changed to (n,o,p). Because the pluralities of input values corresponding to the plurality of negative groups 30, 32, 34, 36 are changed, the original second sum will be changed to (c+d+f+g+h+j+k+n+o+p) accordingly. The method for computing the new second sum is the same as the one described above. The group sums of the plurality of negative groups with the same length are computed first. Namely, the pluralities of input values corresponding to the plurality of first values belonging to the plurality of negative groups with the same length are summed up. Then all of the group sums are summed up to give the second sum.

According to the present embodiment, the input values corresponding to the first negative group 30 are changed to (c,d), and the input values corresponding to the third negative group 34 are changed to (j,k). Hence, the new first group sum is (c+d)+(j+k). The differences between the new first group sum (c+d)+(j+k) and the original first group sum (b+c)+(i+j) come from the replacement of the first values b, i corresponding to the first and third negative groups 30, 34 by the last first values d, k corresponding to the first and third negative groups 30, 34, respectively. Thereby, the operational unit 184 can first sum up the first values b, i corresponding to the first and third negative groups 30, 34 and give a first boundary sum (b+i). The operational unit 184 then sums up the last first values d, k corresponding to the first and third negative groups 30, 34 and gives a new boundary sum (d+k). Next, the first boundary sum (b+i) is subtracted from the original first group sum (b+c)+(i+j), and afterwards the new boundary sum (d+k) is added. The new first group sum is given as (c+d+j+k).

Likewise, according to the present embodiment, the new second group sum can be calculated. The operational unit 184 can first sum up the first first values e, m corresponding to the second and fourth negative groups 32, 36 and give a first boundary sum (e+m). The operational unit 184 then sums up the last first values h, p corresponding to the second and fourth negative groups 32, 36 and gives a new boundary sum (h+p). Next, the first boundary sum (e+m) is subtracted from the original second group sum (e+f+g+m+n+o), and afterwards the new boundary sum (h+p) is added. The new second group sum is given as (f+g+h+n+o+p). After having the new group sums, sum up all of the new group sums to give a new second sum, which, according to the present embodiment, means summing up the new first group sum (c+d+j+k) and the new second group sum (f+g+h+n+o+p) to give the new second sum (c+d+f+g+h+j+k+n+o+p). Finally, subtract twice the new second sum from the new first sum (b+c+d+e+f+g+h+i+j+k+l+m+n+o+p+q+r) to give the second correlation value. According to the description above, the first boundary values (b+i) and (e+m) can be computed prior to the calculation of the second sum of the first correlation value.

It is known from above that the method for computing further provided by the present invention uses the group sum given by the previous computation of correlation value to give the new group sum and the new second sum. Thereby, the new correlation value is given without knowing the new second sum by re-summing up the input values corresponding to all of the negative groups of the PN sequence. Consequently, by using the present method of computing, the number of times of accessing the storage unit 182 can be reduced. In addition, the amount of operations of the operational unit 184 is reduced and the operational speed thereof is increased as well.

According to the present invention, the operational unit 184 performs the operations described above according to operational information produced by the control unit 180 to give the second sum and then to further give the correlation value. The control unit 180 produces the operational information according to the plurality of negative groups of the PN sequence. The operational information includes the position of the input value corresponding to each of the first value of the plurality of negative groups in the PN sequence as well as the lengths of the negative groups. Besides, the circuit for computing correlation of a PN sequence further comprises a register unit 188, which includes a plurality of registers (not shown in the figure) for registering the first sum, the group sums, and the first boundary sum. Thereby, when the operational unit 184 computes subsequent new correlation values, the data stored in the register unit 188 can be read. Accordingly, the amount of operations of the operational unit 184 can be reduced, and the operational speed thereof can be increased as well.

Furthermore, according to the present embodiment, when the operational unit 184 has computed the first correlation value but hasn't received the new input value r, the operational unit 184 will sum up the input values c, j corresponding to the second first values of the first and third negative groups 30, 34 and give a boundary deduction (c+j). In addition, the operational unit 184 will also sum up the input values f, n corresponding to the second first values of the second and fourth negative groups 32, 36 and the input values g, o corresponding to the third first values of the second and fourth negative groups 32, 36, respectively, and give two boundary deductions (f+n) and (g+o). These boundary deductions will be stored in the registers of the register unit 188, respectively, for substituting the first boundary sums sequentially during subsequent computations for correlation values by the operational unit 184. According to the present embodiment, when the operational unit 184 is computing the second correlation value and the new first group sum, the boundary deduction (c+j) will replace the original first boundary sum (b+i) for giving the new first group sum. Likewise, when the operational unit 184 is computing the new second group sum, the boundary deduction (f+n) will replace the original first boundary sum (e+m) for giving the new second group sum. The operational unit 184 then gives the second correlation value according to the new first and second group sums.

It is known from the above description that before the control unit 180 receives new input values, the operational unit 184 will sum up the plurality of input values corresponding to the plurality of first values in the same position of each of the negative groups with the same length and give one or more boundary deductions. The boundary deductions are stored in the plurality of registers of the register unit 188, respectively. When the operational unit 184 gives the correlation value and receives new input value for computing a new correlation value, the boundary deductions stored in the plurality of registers are shifted sequentially to replace the first boundary sums sequentially. Thereby, when the control unit 180 receives new input values, the operational unit 184 can compute group sums sequentially according to the boundary deductions sequentially, and thus the new correlation value can be given.

FIG. 5 shows a schematic diagram of performing circular correlation according to a preferred embodiment of the present invention. As shown in the figure, the difference between the present preferred embodiment and the one in FIG. 4 is that, according to the present preferred embodiment, after the operational unit 184 gives the correlation value, the control unit 180 will not receive new input values. Instead, only the correspondence of the plurality of input values to the plurality first values of the plurality of negative groups is changed for computing subsequent correlation values. Thereby, according to the present preferred embodiment, it is not necessary to re-compute the input sum. The other operations are the same as those according to the previous preferred embodiment. Accordingly, when applying the method for computing according to the present invention to compute circular correlation, the operational time can be further saved and the operational efficiency can be further enhanced.

FIG. 6 shows a schematic diagram of performing linear correlation according to another preferred embodiment of the present invention. The control unit 180 receives the input sequence y(n) and PN sequence p(n). The PN sequence p(n) comprises a plurality of positive groups and a plurality of negative groups. The plurality of positive groups includes a first positive group 40, a second positive group 42, and a third positive group 44. The plurality of negative groups includes a first negative group 50, a second negative group 52, and a third negative group 54. The plurality of second values of the first positive group 40 corresponds to the input values (a, b) of the input sequence y(n); the plurality of second values of the second positive group 42 corresponds to the input values (e, f) of the input sequence y(n); the plurality of second values of the third positive group 44 corresponds to the input values (j, k) of the input sequence y(n); the plurality of first values of the first negative group 50 corresponds to the input values (c, d) of the input sequence y(n); the plurality of first values of the second negative group 52 corresponds to the input values (g, h, i) of the input sequence y(n); the plurality of first values of the third negative group 54 corresponds to the input values (l, m) of the input sequence y(n).

According to the present preferred embodiment, the operational unit 184 sums up the plurality of input values corresponding to the plurality of first values in each of the negative groups with the same length and gives a negative group sum. There are negative groups with two lengths according to the present preferred embodiment. Thereby, the operational unit 184 will give a first negative group sum, which is (c+d)+(l+m), and a second negative group sum, which is (g+h+i). In addition, the operational unit 184 further sums up the first and second negative group sums, and gives a sum (c+d)+(l+m)+(g+h+i). Likewise, the operational unit 184 sums up the plurality of input values corresponding to the plurality of second values in each of the positive groups with the same length and gives a positive group sum. According to the present preferred embodiment, there are positive groups with only one length. Thereby, only one positive group sum is given. By summing up the first, second, and third positive groups 40, 42, 44, the positive group sum is given as (a+b)+(e+f)+(j+k). The operational unit 184 sums up all of the positive group sums and subtracts the sum (c+d)+(l+m)+(g+h+i) to give the correlation value a+b−c−d+e+f−g−h−i+j+k−l−m.

In order to make the operational unit 184 to compute the new correlation value with ease, the operational unit 184 can firstly sum up the input value corresponding the first value of the plurality of negative groups with the same length to give the first boundary sum. That is, the operational unit 184 sums up the input values corresponding to the first values of the first negative group 50 and the third negative group 54, which both have two first values, respectively, to give the first boundary sum of (c+l). According to the present preferred embodiment, because only the second negative group 52 has three first values, the other boundary sum is g. Likewise, the operational unit 184 sums up the input values corresponding to the first second value in each of positive groups with the same length to give the first boundary sum. According to the present preferred embodiment, the input values corresponding to the first second values of the first, second, and third positive groups 40, 42, 44 to give the first boundary sum of (a+e+j).

When the correspondences of the plurality of first values of the plurality of negative groups and of the plurality of second values of the plurality of positive groups to the plurality of input values are changed, for example, when the control unit 180 receives the new input value n and is about to compute the new correlation value, it is necessary to have a new sum, which is given by summing up all of the new negative group sums. According to the present preferred embodiment, the new negative group sum is given by subtracting the first boundary sum from the negative group sum and summing up the new boundary sums. The operational unit 184 first sums up the input values corresponding to the last first values in each of the negative groups with the same length to give the new boundary sum. In the present preferred embodiment, there are negative groups with two lengths, including the first and third negative groups 50, 54 with two first values, and the second negative group 52 with three first values. Thereby, the new boundary sums are (e+n) and j, respectively. Subtracting the first boundary sum of the corresponding negative group from each of the negative group sums and summing up the new boundary sums of the negative groups give the new negative group sum. According to the present preferred embodiment, the negative group sum of the first and third negative groups 50, 54 with two first values is (c+d)+(l+m);

the first boundary sum if (c+l); and the new boundary sum is (e+n). Thereby, the first new negative group sum is (c+d)+(l+m)−(c+l)+(e+n)=d+e+m+n. Besides, the negative group sum of the second negative group 52 with three first values is (g+h+i); the first boundary sum if g; and the new boundary sum is j. Thereby, the first new negative group sum is (g+h+i)−g+j=h+i+j. The operational unit 184 then sums up all of the new negative sums to give the new sum. That is, summing up the first and second new negative group sums to give the new sum d+e+m+n+h+i+j.

In addition, for computing the new correlation value, the new positive group sum is also needed. According to the method described above, the operational unit 184 first sums up the input values corresponding to the last second values in each of the positive groups with the same length to give the new boundary sum. Then, subtracting the first boundary sum of the corresponding positive group from each of the positive group sums and summing up the new boundary sums of the positive groups give the new negative group sum. According to the present preferred embodiment, there exist positive groups with only one length, namely, the first, second, and third positive groups 40, 42, 44 with two second values. The positive group sum is (a+b)+(e+f)+(j+k); the first boundary sum is (a+e+j); and the new boundary sum is (c+g+l). Thereby, the new positive group sum is (a+b)+(e+f)+(j+k)−(a+e+j)+(c+g+l)=b+c+f+g+k+l. Next, the operational unit 184 sums up all of the new group sums and subtracts the new sum to give the new correlation value, which is (b+c+f+g+k+l)−(d+e+m+n+h+i+j)=b+c−d−e+f+g−h−i−j+k+l−m−n according to the present preferred embodiment. Accordingly, the present invention can reduce the amount of operations for computing correlation between the input sequence and the PN sequence, and thus reducing the area of the circuit for computing correlation of the PN sequence in the receiver and the costs.

Furthermore, before the correspondences of the plurality of first values and of the plurality of second values to the plurality of input values are changed, the operational unit 184 sums up the plurality of input values corresponding to the plurality of first values in the same positions in each of the negative groups with the same length to give a plurality of boundary deductions. Thereby, the new negative group sums can be given sequentially by replacing the first boundary sums sequentially in the subsequent computations for new correlation values. According to the present preferred embodiment, the operational unit 184 sums up the input values corresponding to the first values in the same positions in the negative groups with two first values, namely, sums up the input values corresponding to the same positions in the first and third negative groups 50, 54 to give the boundary deduction (d+m). Besides, the operational unit 184 also sums up the input values corresponding to the first values in the same position in the negative groups with three first values. According to the present preferred embodiment, the negative group with three first values is the second negative group 52 only. Thereby, the boundary deductions are h and i, respectively. After the new correlation value is given, the boundary deductions can replace the first boundary sums. Hence, when computing the subsequent new correlation values, the new negative group sums can be computed according to the plurality of boundary deductions, and the operational speed of the operation unit 184 is increased accordingly. Likewise, the operational unit 184 sums up the plurality of input values corresponding to the plurality of second values in the same positions in each of the positive groups with the same length to give a plurality of boundary deductions. According to the present preferred embodiment, the input values corresponding to the same positions in the first, second and third positive groups 40, 42, 44 are summed up to give the boundary deduction (b+f+k). After the new correlation value is given, the boundary deduction can replace the first boundary sum. Hence, when computing the subsequent new correlation values, the new positive group sums can be computed according to the plurality of boundary deductions. In addition, the operational unit 184 uses the register unit 188 to register the first boundary sums, the negative group sums, and the boundary deductions of the negative groups as well as the first boundary sums, the positive groups sums, and the boundary deductions of the positive groups for performing operations with ease.

To sum up, the present invention uses a simple method for computing correlation of a PN sequence. Hence, the operation efficiency is enhanced and the time to give the correlation of the PN sequence is shortened.

Accordingly, the present invention conforms to the legal requirements owing to its novelty, non-obviousness, and utility. However, the foregoing description is only a preferred embodiment of the present invention, not used to limit the scope and range of the present invention. Those equivalent changes or modifications made according to the shape, structure, feature, or spirit described in the claims of the present invention are included in the appended claims of the present invention.

The invention claimed is:

1. A method for computing correlation of a pseudorandom noise (PN) sequence in a communication system, comprising steps of:
   receiving an input sequence and a PN sequence, the input sequence including a plurality of input values, the PN sequence including a plurality of first values and a plurality of second values, and the plurality of first values and the plurality of second values corresponding to the plurality of input values, respectively;
   summing up the plurality of input values, and giving a first sum;
   summing up the plurality of input values corresponding to the plurality of first values in the PN sequence, and giving a second sum; and
   giving a correlation value according to the first sum and the second sum.

2. The method of claim 1, wherein the correlation value is given by subtracting twice the second sum from the first sum.

3. The method of claim 1, wherein the plurality of first values is divided into a plurality of negative groups, and the step of summing up the plurality of input values corresponding to the plurality of first values in the PN sequence and giving the second sum further comprises steps of:
   summing up the input value corresponding to the first value in each of the negative groups with the same length, and giving a first boundary sum;
   summing up the plurality of input values corresponding to the plurality of first values in each of the negative groups with the same length, and giving a group sum; and
   summing all of the group sums, and giving the second sum.

4. The method of claim 3, and when a new correlation value is to be computed, further comprising steps of:
   receiving a new input value, and replacing an input value of the plurality of input values;
   adding the new input value to the first sum and subtracting the replaced input value, and giving a new first sum;
   changing the correspondence of the plurality of first values of the plurality of negative groups to the plurality of input values;

summing up the input values corresponding to the last first value in each of the negative groups with the same length, and giving a new boundary sum;

subtracting the first boundary sum from the group sum and adding the new boundary sum, and giving a new group sum;

summing up all of the new group sums, and giving a new second sum; and giving the new correlation value according to the new first sum and the new second sum.

5. The method of claim 4, wherein the new correlation value is given by subtracting twice the new second sum from the new first sum.

6. The method of claim 4, and before the step of receiving the new input value and replacing an input value of the plurality of input values, further comprising a step of summing up the plurality of input values corresponding to the plurality of first values in the same positions in each of the negative groups with the same length, giving one or more boundary deductions, replacing the first boundary sum sequentially after giving the new correlation value, and giving subsequent new correlation values sequentially according to the boundary deductions while receiving the new input value subsequently.

7. The method of claim 3, and when a new correlation value is to be computed, further comprising steps of:

changing the correspondence of the plurality of first values of the plurality of negative groups to the plurality of input values;

summing up the input values corresponding to the last first value in each of the negative groups with the same length, and giving a new boundary sum;

subtracting the first boundary sum from the group sum and adding the new boundary sum, and giving a new group sum;

summing up all of the new group sums, and giving a new second sum; and giving the new correlation value according to the new first sum and the new second sum.

8. The method of claim 7, wherein the new correlation value is given by subtracting twice the new second sum from the new first sum.

9. The method of claim 7, and before the step of changing the correspondence of the plurality of first values of the plurality of negative groups to the plurality of input values, further comprising a step of summing up the plurality of input values corresponding to the plurality of first values in the same positions in each of the negative groups with the same length, giving one or more boundary deductions, replacing the first boundary sum sequentially after giving the new correlation value, and giving subsequent new correlation values sequentially according to the boundary deductions while giving the new correlation value subsequently.

10. The method of claim 1, wherein the plurality of first values is a plurality of negative PN values; and the plurality of second values is a plurality of positive PN values.

11. A circuit for computing correlation of a pseudorandom noise (PN) sequence, comprising:

a control unit, receiving an input sequence and a PN sequence, the input sequence including a plurality of input values, the PN sequence including a plurality of first values and a plurality of second values, the plurality of first values and the plurality of second values corresponding to the plurality of input values, respectively, and the control unit producing a control signal according to the plurality of first values;

a storage unit, storing the plurality of input values received by the control unit, and outputting the plurality of input values corresponding to the plurality of first values according to the control signal; and an operational unit, summing up the plurality of input values for giving a first sum, summing up the plurality of input values corresponding to the plurality of the first values in the PN sequence output by the storage unit for giving a second sum, and giving a correlation value according to the first sum and the second sum.

12. The circuit of claim 11, wherein the operational unit subtracts twice the second sum from the first sum to give the correlation value.

13. The circuit of claim 11, wherein the plurality of first values is divided into a plurality of negative groups; the operational unit sums up the input value corresponding to the first value in each of the negative groups with the same length for giving a first boundary sum; the operational unit sums up the plurality of input values corresponding to the plurality of first values in each of the negative groups with the same length for giving a group sum; and the operational unit sums up all of the group for giving the second sum.

14. The circuit of claim 13, wherein the control unit produces operational information according to the plurality of negative groups and transmits the operational information to the operational unit; and the operational unit computes and gives the second sum according to the operational information.

15. The circuit of claim 13, wherein the control unit receives a new input value after the operational unit giving the correlation value and stores the new input value to the storage unit to replace an input value of the plurality of input values; the operational unit adds the new input value to the first sum and subtracts the replaced input value to give a new first sum; the correspondence of the plurality of first values of the plurality of negative groups to the corresponding plurality of input values is changed; the operational unit sums up the input values corresponding to the last first value in each of the negative groups with the same length for giving a new boundary sum; the first boundary sum is subtracted from the group sum and the new boundary sum is added for giving a new group sum; all of the new group sums are summed up for giving a new second sum; and the operational unit subtracts twice the new second sum from the new first sum to give a new correlation value.

16. The circuit of claim 15, wherein before the control unit receives the new input value and replaces an input value of the plurality of input values, the operational unit sums up the plurality of input values corresponding to the plurality of first values in the same positions in each of the negative groups with the same length, and gives one or more boundary deductions; the boundary deductions replaces the first boundary sum sequentially after giving the new correlation value; and the operational unit gives subsequent new correlation values sequentially according to the boundary deductions while receiving the new input value subsequently.

17. The circuit of claim 13, wherein after the operational unit giving the correlation value, the control unit changes the correspondence of the plurality of first values of the plurality of negative groups to the plurality of input values for giving a new correlation value; the operational unit sums up the input values corresponding to the last first value in each of the negative groups with the same length, and gives a new boundary sum; the operational unit subtracts the first boundary sum from the group sum and adds the new boundary sum, and gives a new group sum; the operational unit sums up all of the new group sums, and gives a new second sum; and the operational unit subtracts twice the new second sum from the new first sum to give a new correlation value.

18. The circuit of claim 17, wherein before the control unit changes the correspondence of the plurality of first values of the plurality of negative groups to the plurality of input values, the operational unit sums up the plurality of input values corresponding to the plurality of first values in the same positions in each of the negative groups with the same length, and gives one or more boundary deductions; the boundary deductions replaces the first boundary sum sequentially after giving the new correlation value; and the operational unit gives subsequent new correlation values sequentially according to the boundary deductions while receiving the new input value subsequently.

19. A method for computing correlation of a pseudorandom noise (PN) sequence in a communication system, comprising steps of:

receiving an input sequence and a PN sequence, the input sequence including a plurality of input values, the PN sequence including a plurality of first values and a plurality of second values, and the plurality of first values and the plurality of second values corresponding to the plurality of input values, respectively;

summing up the input value corresponding to the first value in each of the negative groups with the same length, and giving a first boundary sum;

summing up the plurality of input values corresponding to the plurality of first values in each of the negative groups with the same length, and giving a negative group sum;

summing all of the negative group sums, and giving a sum;

summing up the input value corresponding to the first second value in each of the positive groups with the same length, and giving a first boundary sum;

summing up the plurality of input values corresponding to the plurality of second values in each of the positive groups with the same length, and giving a positive group sum;

summing all of the positive group sums and subtracting the sum, and giving a correlation value;

changing the correspondences of the plurality of first values in the plurality of negative groups and of the plurality of second values in the plurality of positive groups to the plurality of input values for giving a new correlation value;

summing up the input values corresponding to the last first value in each of the negative groups with the same length, and giving a new boundary sum;

subtracting the first boundary sum of each of the negative groups from the corresponding negative group sum and adding the new boundary sum of the negative group, and giving a new negative group sum;

summing up all of the new negative group sums, and giving a new sum;

summing up the input values corresponding to the last second value in each of the positive groups with the same length, and giving a new boundary sum;

subtracting the first boundary sum of each of the positive groups from the corresponding positive group sum and adding the new boundary sum of the positive group, and giving a new positive group sum; and summing up all of the new positive group sums and subtracting the new sum, and giving the new correlation value.

20. The method of claim 19, and before the step of changing the correspondences of the plurality of first values in the plurality of negative groups and of the plurality of second values in the plurality of positive groups to the plurality of input values for giving a new correlation value, further comprising steps of:

summing up the plurality of input values corresponding to the plurality of first values in the same positions in each of the negative groups with the same length, giving one or more boundary deductions, replacing the first boundary sum sequentially after giving the new correlation value, and giving subsequent new correlation values sequentially according to the boundary deductions while giving the new correlation value subsequently; and summing up the plurality of input values corresponding to the plurality of second values in the same positions in each of the positive groups with the same length, giving one or more boundary deductions, replacing the first boundary sum sequentially after giving the new correlation value, and giving subsequent new correlation values sequentially according to the boundary deductions while giving the new correlation value subsequently.

* * * * *